United States Patent [19]

Drent et al.

[11] Patent Number: 4,970,294

[45] Date of Patent: Nov. 13, 1990

[54] α-OLEFIN/CARBON MONOXIDE COPOLYMERS AND CATALYST AND PROCESS FOR MAKING

[75] Inventors: Eit Drent; Richard L. Wife, both of CM Amsterdam, Netherlands

[73] Assignee: Shell Oil Company, Houston, Tex.

[21] Appl. No.: 282,248

[22] Filed: Dec. 8, 1988

[51] Int. Cl.$^5$ .............................................. C08G 67/02
[52] U.S. Cl. ................................................. 528/392
[58] Field of Search ........................................ 528/392

[56]           References Cited

U.S. PATENT DOCUMENTS

| | | | |
|---|---|---|---|
| 2,495,286 | 1/1950 | Brubaker | 528/392 |
| 3,448,140 | 6/1969 | Gamlen et al. | 260/471 |
| 3,689,460 | 9/1972 | Nozaki | 260/63 CQ |
| 3,694,412 | 9/1972 | Nozaki | 260/63 CQ |
| 3,780,140 | 12/1973 | Hammer | 528/392 |
| 3,835,123 | 9/1974 | Nozaki | 260/94.9 B |
| 3,914,391 | 10/1975 | Nozaki | 423/364 |
| 3,984,388 | 10/1976 | Shryne et al. | 260/63 CQ |
| 4,024,326 | 5/1977 | Hudgin | 526/11.1 |
| 4,070,532 | 1/1978 | Hammer | 528/392 |
| 4,076,911 | 2/1978 | Fenton | 526/11.1 |
| 4,424,317 | 1/1984 | Serres et al. | 528/392 |
| 4,473,482 | 9/1984 | Serres et al. | 252/52 R |
| 4,474,978 | 10/1984 | Drent et al. | 560/24 |
| 4,543,440 | 9/1985 | Loomis | 528/392 |

FOREIGN PATENT DOCUMENTS

| | | |
|---|---|---|
| 0121965 | 10/1984 | European Pat. Off. ............ 528/392 |
| 213671 | 3/1987 | European Pat. Off. . |
| 222054 | 5/1987 | European Pat. Off. . |
| 2046968 | 10/1964 | Japan . |
| 603481 | 6/1948 | United Kingdom . |
| 1081304 | 2/1966 | United Kingdom . |
| 2058074 | 8/1979 | United Kingdom . |
| 181014 | 10/1985 | United Kingdom . |
| 0235865 | 9/1987 | United Kingdom ................ 528/392 |
| 0235866 | 9/1987 | United Kingdom ................ 528/392 |

OTHER PUBLICATIONS

Novel Palladium(II)-Catalyzed Copolymerization of Carbon Monoxide with Olefins, J. A. Chem. Soc., 1982, 104, 3520-2, Sen and Lai.
Palladium(II)-Catalyzed Copolymerization of Carbon Monoxide with Ethylene, Organometallics 1984, 3, 866-70, Sen and Lai.
Adv. Polym. Sci. 1986, 73-4, 125-44.
Polym. Lett. 1965, 3, 703-7.
Chim. Ind. 1971, 53, 939-40.
J. Mol. Catal. 1983, 18, 117-25.
J. Organomet Chem. 1985, 279, C5-C10.

Primary Examiner—Merrell C. Cashion, Jr.
Assistant Examiner—Carlos Azpuru
Attorney, Agent, or Firm—Dean F. Vance

[57]           ABSTRACT

A process for polymerizing carbon monoxide and at least one $C_3$-$C_{10}$ α-olefin in the presence of a catalyst comprising palladium, a non-noble transition metal salt of an acid with a pKa of less than 2, and a bisphosphine compound, in the presence of a diluent comprising at least 5 volume percent of an aliphatic primary alcohol, and at least 75 volume percent of at least one of a aliphatic tertiary mono-alcohol or an aromatic hydrocarbon, forming a copolymer.

21 Claims, No Drawings

α-OLEFIN/CARBON MONOXIDE COPOLYMERS AND CATALYST AND PROCESS FOR MAKING

BACKGROUND OF THE INVENTION

This invention relates to copolymers of carbon monoxide and α-olefins, to a catalyst composition for making such copolymers, to a process for making the copolymers, and to articles made from such copolymers.

Linear alternating polymers of carbon monoxide and one or more ethenically unsaturated hydrocarbons are well known. They are generally prepared by contacting the monomers together at an elevated temperature and pressure, in the presence of a solution of catalyst and in a diluent in which the polymers are insoluble or virtually insoluble. The catalyst will typically comprise a palladium compound, an anion of an acid with a pKa of less than 6 (determined in aqueous solution at 18° C), and a bisphosphine of the general formula $R^1R^2P-R-PR^3R^4$ wherein $R^1$, $R^2$, $R^3$, and $R^4$ represent aryl groups which may be substituted with polar groups, and R represents a bivalent organic bridging group containing at least two carbon atoms in the bridge.

The anion occurring in the catalyst composition may be in the form of an acid or a salt. Suitable salts include main group metal salts such as tin, aluminum and antimony salts, as well as non-noble transition metal salts, such as copper, nickel and iron salts. Suitable acids, the ultimate selection of which will depend upon the bisphosphine selected, include strong acids with pKa of less than 2, such as perchloric acid, trifluoroacetic acid and para-toluenesulphonic acid, moderately strong acids having a pKa in a range from about 2 to about 4, such as phosphonic acid, tartaric acid and 2,5-dihydroxybenzoic acid, and weaker acids with a pKa in a range from about 4 to about 6, such as acetic acid.

Suitable bisphosphines include those in which aryl groups $R^1$, $R^2$, $R^3$, and $R^4$ contain no polar substitutes and those in which at least one of the aryl groups contains at least one polar substituent.

Suitable diluents in which the polymerization may be carried out include mono-alcohols, such as methanol, ethanol and propanol, aromatic hydrocarbons, such as toluene, aliphatic esters, such as ethyl acetate and methyl propionate, ketones, such as acetone and methyl ethyl ketone, ethers, such as anisole, glycoles, such as ethylene glycol and glycol ethers, such as dimethyl ether of diethylene glycol. Both single diluents and compound diluents such as alcohol/ketone mixtures are suitable.

In the preparation of polymers of carbon monoxide and an α-olefin using the above catalyst, both reaction rates and the molecular weights of the polymers formed are important. It is desireable to maximize the polymerization rate and also to maximize the molecular weight of the polymer. Although both reaction rates and molecular weights are functions of temperature, reaction rate varies directly with reaction temperature, whereas, molecular weight varies inversely with reaction temperature. In the copolymerization of carbon monoxide with an olefin, the general practice is to conduct the polymerization at such a temperature as to achieve two minimum criteria: a reaction rate of at least 0.1 kg copolymer/gram palladium-hour, and an average molecular weight of the polymers obtained of at least 5000.

These minimum crIteria can generally be achieved when copolymerizing carbon monoxide and ethylene, a $C_2$ α-olefin. These carbon monoxide/ethylene copolymers will have very high melting points and should be worked up in a molten condition, usually at a temperature at least 25 C. above the melting point. However, at such high temperatures the polymers have been found to be rather unstable and to exhibit discoloring and disintegration. The incorporation of a third monomer selected from among α-olefins having from about 3 to about 10 carbon atoms produces a terpolymer having a lower melting point than the carbon monoxide/ethylene copolymer, such that these terpolymers may be worked up at temperatures low enough so that the terpolymer will not exhibit discoloring or disintegration. Of course the higher the $C_3-C_{10}$ α-olefin content contained in the terpolymer, the lower the terpolymer melting point. These terpolymers have been produced with the above described catalyst under conditions that will meet the minimum criteria above.

When producing copolymers of a carbon monoxide and at least one $C_3-C_{10}$ α-olefin, using the known processes and catalysts, it has been found that, barring a few exceptions, it is impossible to prepare such copolymers, while at the same time upholding the two minimum criteria of reaction rate and molecular weight.

It is therefore an object of the present invention to provide for an alternating copolymer of carbon monoxide and at least one $C_3-C_{10}$ α-olefin. It is another object of the present invention to provide articles prepared from such copolymers. It is yet another object of the present invention to provide a process for making the such copolymers.

BRIEF SUMMARY OF THE INVENTION

According to the present invention there is provided a process for making a copolymer comprising contacting in the presence of a catalyst, under polymerization conditions, carbon monoxide and at least one $C_3-C_{10}$ α-olefin, wherein the catalyst composition comprises:

(a) a palladium compound, (b) a non-noble transition metal salt of an acid with a pKa of less than 2, (c) a bisphosphine of the general formula $R^5R^6P-R-PR^7R^8$ wherein $R^5$, $R^6$, $R^7$, and $R^8$ represent aryl groups with at least $R^5$ and $R^7$ each containing one or more polar substituents of which at least one polar substituent per aryl group is in the ortho position relative to the phosphorus atom to which the aryl group concerned is bound, and wherein R is a bivalent organic bridging group containing at least two carbon atoms in the bridge; and wherein said contacting occurs in a diluent which comprises at least 5 volume percent of at least one $C_1-C_{10}$ aliphatic primary alcohol and at least 75 volume percent of at least one compound selected from a group consisting of $C_4-C_{10}$ tertiary mono-alcohols, $C_6-C_{10}$ aromatic hydrocarbons, and mixtures of such alcohols and hydrocarbons.

According to another embodiment of the present invention there are provided articles of manufacture from the above copolymers.

DETAILED DESCRIPTION OF THE INVENTION

The palladium compound employed as component (a) of the catalyst used in the present invention process can generally be any palladium compound, but is preferably a palladium salt of a carboxylic acid, most preferably palladium acetate.

Component (b) is a non-noble transition metal salt of an acid with a pKa of less than 2. Examples of such suitable acids include sulfuric acid, perchloric acid, sulfonic acids, and carboxylic acids. Suitable sulfonic acids include methane sulphonic acid, trifluoromethane sulphonic acid, and para-toluene sulphonic acid. Suitable carboxylic acids include trichloroacetic acid, difluoroacetic acid, and trifluoroacetic acid. Preferably component (b) is a non-noble transition metal salt of a perchloric acid.

Non-noble transition metals are generally all transition metals, including actinides and lanthanides, but excluding the noble metals ruthenium, osmium, rhodium, iridium, palladium, platinum, silver and gold. Examples of transition metals whose salts are suitable for use as component (b) include zirconium, vanadium, chromium, manganese, iron, nickel, copper, zinc, cerium and thorium. Preferably a nickel salt is used. Most preferably component (b) is a nickel salt of a perchloric acid.

Generally component (b) is present in the catalyst composition in an amount in the range of about 0.5 to about 50 mols per gram atom of palladium. Preferably component (b) is present in the catalyst composition in an amount in the range of about 1 to about 25 mols per gram atom of palladium.

In component (c) the aryl groups $R^5$, $R^6$, $R^7$, and $R^8$ are preferably phenyl groups in which at least the groups $R^5$ and $R^7$ each contain one or more polar substituents of which at least one polar substituent per phenyl group is in a position ortho to the phosphorus atom to which the phenyl group concerned is bound. $R^6$ and $R^8$ may also contain polar substituents. Suitable polar substituents include alkoxy groups, such as methoxy groups and thioalkyl groups such as thiomethyl groups. Alkoxy groups are preferred polar substituents, with methoxy groups being the most preferred alkoxy groups.

The bridging group in the bisphosphine of component (c) can be any suitable compound, but is generally a group that contains three atoms in the bridge, at least two of which are carbon atoms. Examples of suitable bridging groups include the $-CH_2-CH_2-CH_2-$ group, the $-CH_2-C(CH_3)H_2$ group, and the $-CH_2-Si(CH_3)-CH_2-$ group.

Bisphosphines in which each one of the groups $R^5$, $R^6$, $R^7$, and $R^8$ contains one or more polar substituents can be used in the present invention. If such bisphosphines are used, those in which the groups $R^5$, $R^6$, $R^7$, and $R^8$ are the same or similar to one another are preferred. Examples of such bisphosphines includes 1,3-bis[di(2-methoxyphenyl)phosphino]propane, 1,3-bis[di(2,4-dimethoxyphenyl)phosphino]propane, 1,3-bis[di(2,6-dimethoxyphenyl)phosphino]propane, and 1,3-bis[di(2,4,6-trimethoxyphenyl)phosphino]propane, with 1,3-bis[di(2-methoxyphenyl) phosphino]propane being preferred.

The bisphosphines of the present invention will generally be employed in the range from about 0.5 to about 2 mols per gram atom of palladium, most preferably in the range of about 0.75 to about 1.5 mols per gram atom of palladium.

The diluent, comprises at least 5 volume percent of at least one $C_l$–$C_{10}$ aliphatic primary alcohol and at least 75 volume percent of at least one compound selected from a group consisting of $C_4$–$C_{10}$ tertiary monoalcohols, $C_6$–$C_{10}$ aromatic hydrocarbons, and mixtures of such tertiary mono-alcohols and such hydrocarbons.

Suitable aliphatic primary alcohols include methanol, ethanol, propanol-1, butanol-1 and glycol. Suitable aromatic hydrocarbons include toluene, and xylene, and suitable tertiary mono alcohols include tertiary butyl alcohol and tertiary amyl alcohol.

The copolymers of the present invention comprise linear chains in which units derived from carbon monoxide and units derived from the α-olefin alternate with one another, such that on each side of each unit derived from carbon monoxide, there occurs a unit derived from the particular α-olefin used. For example, a polymer formed from the polymerization of carbon monoxide with an α-olefin A wherein A′ is a $C_3$–$C_{10}$ alkyl group, and represents a monomer unit derived from the α-olefin A, would have repeating units —(CO)—A′—.

Other components, such as 1,4-quinones, can be employed in the present invention as a component (d). Generally, any 1,4-quinone can be used, although 1,4-benzoquinone and 1,4-naphthoquinone are preferred. Generally the 1,4-quinone is present in the catalyst solution in a ratio in the range of about 5 mols to about 5000 mols 1,4-quinone per gram atom of palladium, and preferably in a ratio in the range of about 10 mols to about 10000 mols 1,4-quinone per gram atom palladium.

Generally, the carbon monoxide and the α-olefin can be polymerized in the presence of the palladium catalyst by any known means. The polymerization will generally be conducted at a temperature in the range from about 40° C. to about 120° C., at a pressure in the range from about 20 bar to about 150 bar, and with a quantity of catalyst composition containing in the range of about $10^{-7}$ to about $10^{-3}$ gram atom of palladium per mole of α-olefin to be polymerized. Preferably, the polymerization will generally be conducted at a temperature in the range from about 50° C. to about 100° C., at a pressure in the range from about 30 bar to about 100 bar, and with a quantity of catalyst composition containing in the range of about $10^{-6}$ to about $10^{-4}$ gram atom of palladium per mole of α-olefin to be polymerized.

The copolymers of the present invention can be shaped, processed, compounded, or molded by any of the generally known plastics processing methods, including but not limited to, injection molding, stamp molding, pultrusion, extrusion, blow molding, and others. Furthermore, these copolymers may be blended, processed, or combined with other polymers, pigments, fillers, curing agents, reinforcements, fibers, and other materials as are generally used in the plastics industry. The copolymers of the present invention may be shaped into numerous useful objects, including automotive and aircraft parts, storage containers, films, circuit boards and appliance housings, for example.

Examples

In Examples 3–5 carbon monoxide/propylene copolymers were prepared in a diluent mixture which comprised more than 5 volume percent methanol, and further comprised more than 75 percent of either tertiary butyl alcohol, toluene, or a mixture of both. The catalyst composition contained palladium acetate as component (a), nickel perchlorate as component (b) and an ortho-methoxyaryl-substituted bisphosphine as component (c). The copolymers prepared in these examples satisfied the minimum criteria for both average molecular weight and for reaction rate.

In the remaining examples, 1, 2, and 6–15, copolymers of carbon monoxide with propylene, butene-1, and octene-1 were prepared, utilizing various combinations of methanol as the diluent, a catalyst compostion containing an acid as component (b), and a non-polarly substituted bisphosphine as component (c). The copolymers prepared in these examples, did not satisfy the minumum criteria for molecular weight and reaction rate. In Example 6 no polymer was formed, and in Example 1, in which methanol was the diluent, a carbon monoxide/ethene copolymer with a high average molecular at a high reaction rate was prepared.

The average molecular weights given in the Examples were established with the aid of $^{13}$C-NMR analysis. It was further established with $^{13}$C-NMR analysis that the carbon monoxide/α-olefin copolymers prepared in Examples 1-5 and 7-16 had a linear alternating structure, and that they consisted of units of the formula —(CO)—A'—, wherein A' represents a monomer unit derived from the particular α-olefin A (ethene, propene, butene-1 or octene-1) that was used.

The difference in polymerization behavior between ethene and propylene is clearly shown by the comparison of the results of Examples 1 and 2 in which identical diluents and catalyst compositions were used. In Example 1, a carbon monoxide/ethene copolymer with an average molecular weight greater than 50,000 was formed at a reaction rate of 3.5 kg/g palladium hour at 65° C., whereas in Example 2, a carbon monoxide/propene copolymer with an average molecular weight of between about 3000 to about 4000 was formed at a reaction rate of 0.1 kg/g palladium hour at 45° C.

Examples 3 and 4 in which the same catalyst composition, and the same diluent were utilized, demonstrate the effect of temperaure on the average molecular weight and the reaction rate in the preparation of carbon monoxide/propene copolymers. In Example 3, a 65° C. reaction temperature yielded a monoxide/propene copolymer with an average molecular weight in the range of about 6000 to about 7000, formed at a reaction rate of 0.3 kg/g palladium hour, whereas in Example 4, a 41° C. reaction temperature yielded a copolymer with an average molecular higher than 50,000, formed at a reaction rate of 0.1 kg/g hour.

The influence which the reaction temperature has on average molecular weights and reacton rates in the preparation of copolymers of carbon monoxide with propene, butene-1, and octene-1 by the known methods, becomes evident when the results of Examples 9-16 are compared with one another in pairs (9/10, 11/12, 13/14 and 15/16). All the pairs of examples were carried out under substantially the same reaction conditions, with the reaction temperature being the only variable. These examples demonstrate that when the minimum criterion for the reaction rate is satisfied (Examples 9, 11, 13,5), reduction of the reaction temperature in the known process methods, fails to result in the minimum criterion for the average molecular weight being satisfied (Examples 10, 12, 14, 16).

Example 1

A carbon monoxide/ethene copolymer was prepared as follows. 200 ml of methanol was charged into a mechanically stirred 300 ml autoclave, and then heated to 65° C. Ethene and carbon monoxide were then charged in such quantities that their respective partial pressures were 15 bar. A catalyst solution comprising 23.5 ml methanol, 1.5 ml toluene, 0.06 mmol palladium acetate, 0.3 mmol nickel perchlorate, 0.07 mmol 2,3-bis[di(2-methoxyphenyl)phosphino]propane, and 3 mmol 1,4-naphthoquinone, was introduced into the autoclave.

The autoclave pressure was maintained for 1 hour by charging a 1:1 carbon monoxide/ethene mixture. The polymerization was then terminated by cooling the reaction mixture to room temperature, and releasing the pressure. The copolymer was filtered, washed with methanol, and dried at 70° C.

The yield was 22.3 g of copolymer with an average molecular weight of more than 50,000, and the polymerization rate was 3.5 kg copolymer/g palladium hour.

Example 2

A carbon monoxide/propene copolymer was prepared as follows. 75 ml of methanol was charged in to a 300 ml mechanically stirred autoclave. The autoclave was pressurized to 20 bar with carbon monoxide, followed by the addition of 75 ml of propene. The contents of the autoclave were then heated to 45° C. and a catalyst solution of the same compostion as in Example 1 was added. The autoclave pressure was maintained with carbon monoxide. After 8 hours the polymerization was terminated by cooling the reaction mixture to room temperature and releasing the pressure. The copolymer was isolated by boiling the reaction mixture down.

The yield was 5 g of copolymer with an average molecular weight in the range of about 3000 to about 4000, and the polymerization rate was 0.1 kg copolymer/g palladium hour.

Example 3

A carbon monoxide/propene copolymer was prepared as in Example 2, except that, 130 ml of tertiary butanol was charged to the autoclave instead of 75 ml methanol, reaction temperature was 65° C., the catalyst contained 11 ml methanol instead of 23.5 ml methanol, the reaction time was 5 hours, and the copolymer was isolated from the reaction product by separating the polymer layer from the solvent layer and removing the residual solvent from the polymer layer with a vacuum.

The yield was 10 g of copolymer with an average molecular weight in the range of about 6000 to about 7000, and the polymerization rate was 0.3 kg copolymer/g palladium hour.

Example 4

A carbon monoxide/propene copolymer was prepared as in Example 3, except that, the reaction temperature was 41° C., the catalyst solution contained 21.5 ml methanol and 20 ml toluene instead of 11 ml methanol and 1.5 ml toluene, and the reaction time was 20 hours.

The yield was 12.7 g of copolymer with an average molecular weight of 50,000, and the polymerization rate was 0.1 kg copolymer/g palladium hour.

Example 5

A carbon monoxide/propene copolymer was prepared as in example 3, except that, the autoclave was charged with 130 ml toluene instead of with 130 tertiary butanol, and the catalyst solution comprised 10 ml methanol, 20 ml toluene, 0.12 mmol palladium acetate, 0.6 mmol nickel perchlorate, 0.14 mmol 1,3-bis[di(2-methoxy-phenyl)phosphino propane, and 5 mmol 1,4-naphthoquinone.

The yield was 6 g of copolymer with an average molecular weight in the range of about 6000 to about 7000, and the polymerization rate was 0.1 kg copolymer/g palladium hour.

Example 6

Example 2 was substantially repeated except that, the autoclave was charged with 130 ml tertiary butanol instead of with 75 ml methanol, and the catalyst solution contained 0.24 mmol perchloric acid instead of 0.3 mmol nickel perchlorate.

No polymer material was formed.

Example 7

A carbon monoxide/propene copolymer was prepared as in example 3, except that, the catalyst solution comprised 23.5 ml methanol, 1.5 ml toluene, 0.4 mmol palladium acetate, 0.4 mmol copper para-tosylate and 0.5 mmol 1,3-bis[di(2-methoxy-phenyl-phenyl)phosphino propane, and the reaction time was 20 hours.

The yield was 58 g of copolymer with an average molecular weight in the range of about 3000 to about 4000, and the polymerization rate was 0.07 kg copolmer/g palladium hour.

Example 8

A carbon monoxide/propene copolymer was prepared as follows. A magnetically stirred 250 ml autoclave was charged with a catalyst solution comprising 50 ml methanol, 0.1 mmol palladium acetate, 2 mmol copper para-tosylate, and 0.5 mmol 1,3-bis(diphenyl,-phosphino) propane. Next, 30 ml of liquid propene, and an amount of carbon monoxide sufficient to raise the pressure in the autoclave to 40 bar, were charged to the autoclave. The contents were then heated to 85° C., and after 5 hours, the polymerization was terminated by cooling to room temperature, and releasing the pressure. After the reactor contents were cooled to −20° C., the copolymer was filtered off, washed with methanol and vacuum dried at room temperature.

The yield was 15 g of copolymer with an average molecular weight in the range of about 1000 to about 2000, and the polymerization rate was 0.3 kg copolymer/g palladium hour.

Example 9

A carbon monoxide/propene copolymer was prepared as in Example 9, except that the reaction temperature was 65° C. The yield was 4 g of copolymer with an average molecular weight in the range of about 2000 to about 3000, and the polymerization rate was 0.08 kg copolymer/g palladium hour.

Example 10

A carbon monoxide/octene-1 copolymer was prepared in substantially the same way as the copolymer of Example 8, except that the autoclave was charged with 20 ml of octene-1 instead of 30 ml of propene, the reaction temperature was 90° C., and the copolymer was isolated by boiling the reaction mixture down. The yield was 6 g of copolymer with an average molecular weight in the range of about 300 to about 600, and the polymerization rate was 0.12 kg copolymer/g palladium hour.

Example 11

A carbon monoxide/octene-1 copolymer was prepared in substantially the same way as the copolymer of Example 10, except that the reaction temperature was 65° C.

The yield was 1.5 g of copolymer with an average molecular weight in the range of about 800 to about 1000, and the polymerization rate was 0.03 kg copolymer/g palladium hour.

Example 12

A carbon monoxide/propene copolymer was prepared as follows. A 250 ml magnetically stirred autoclave was charged with a catalyst solution comprising 50 ml methanol, 0.1 mmol palladium acetate, 2 mmol trifluoro acetic acid, and 0.15 mmol 1,3-bis(diphenylphosphine) propane.

After the autoclave was flushed with carbon monoxide, it was charged with carbon monoxide to a pressure of 30 bar, and then further charged with propene to a pressure of 38bar. The contents were then heated to 90° C. The polymerization was terminated after 1 hour, by cooling the reaction mixture to room temperature and releasing the pressure.

The copolymer obtained had a average molecular weight in the range of about 500 to about 750, and the polymerization rate was 0.4 kg copolymer/g palladium hour.

Example 13

A carbon monoxide/octene-1 copolymer was prepared in substantially the same way as the copolymer in Example 12, except that the reaction temperature was 65° C.

The copolymer obtained had a average molecular weight in the range of about 750 to about 1000, and the polymerization rate was 0.035 kg copolymer/g palladium hour.

Example 14

A carbon monoxide/butene-1 copolymer was prepared in substantially the same way as the copolymer in Example 12, except that the autoclave was charged to a with carbon monoxide to a pressure of 40 bar, and then charged with butene-1 to a pressure of 45 bar.

The copolymer obtained had a average molecular weight in the range of about 400 to about 600, and the polymerization rate was 0.25 kg copolymer/g palladium hour.

Example 15

A carbon monoide/butene-1 copolymer was prepared as in Example 14, except that the reaction temperature was 65° C.

The copolymer obtained had a average molecular weight in the range of about 750 to about 1000, and the polymerization rate was 0.03 kg copolymer/g palladium hour.

We claim:

1. A process for the preparation of a polymer at a reaction rate of at least 0.1 kg polymer/gram palladium-hour, said polymer having an average molecular weight of at least 5000, as determined by $^{13}C$-NMR, the process comprising contacting, under polymerization conditions, carbon monoxide and a $C_3$–$C_{10}$ α-olefin in a diluent in the presence of a catalyst comprising:
   (a) a palladium compound,
   (b) a non-noble transition metal salt of an acid of pKa of less than 2, said non-noble metal being selected from the group consisting of zirconium, vanadium, chromium, manganese, iron, nickel, copper, zinc, cerium or thorium, and
   (c) a bisphosphine of the general formula $R^5R^6P$-R-$PR^7R^8$ wherein $R^5$, $R^6$, $R^7$, and $R^8$ represent aryl groups with at least $R^5$ and $R^7$ each containing at least one polar substituent in the ortho position relative to the phosphorus atom to which the aryl group concerned is bound, and wherein R is a bivalent organic bridging group containing at least two carbon atoms in the bridge, the diluent comprising at least 5 volume percent of a $C_1$-$C_{10}$ aliphatic primary alcohol and at least 75 volume percent of a compound selected from the group consisting of $C_4$-$C_{10}$ tertiary mono-alcohols, $C_6$-$C_{10}$ aromatic hydrocarbons, and mixtures of such alcohols and hydrocarbons.

2. The process of claim 1 wherein component (a) is a palladium salt of a carboxylic acid, component (b) is non-noble transition metal salt of a perchloric acid, and component (c) is a bisphosphine in which the aryl groups $R^5$, $R^6$, $R^7$, and $R^8$ are phenyl groups.

3. The process of claim 2 wherein component (a) is palladium acetate, component (b) is a nickel salt of a perchloric acid, and the polar substituents are selected from alkoxy and thioalkoxy groups.

4. The process of claim 3 wherein the aliphatic primary alcohol is selected from the group consisting of methanol, ethanol, propanol-1, butanol-1 and glycol, wherein the tertiary mono-alcohol is selected from the group consisting of tertiary butyl alcohol and tertiary amyl alcohol, and wherein the aromatic hydrocarbon is selected from the group consisting of toluene and xylene.

5. The process of claim 4 wherein the ploymerization is carried out at a temperature in the range of about 40° C. to about 120° C. and at a pressure in the range of about 20 bar to about 150 bar, the amount of catalyst composition is in the range of about $10^{-7}$ to about $10^{-3}$ gram atom of palladium per mol of α-olefin to be polymerized, the amount of component (b) present in the catalyst is in the range of about 0.5 to about 50 mols per gram atom of palladium, and the amount of component (c) present in the catalyst is in the range of about 0.5 to about 2 mols per gram atom of palladium.

6. The process of claim 5 wherein the groups $R^5$, $R^6$, $R^7$, and $R^8$ of component (c) are identical to one another.

7. The process of claim 6 wherein the α-olefin is propene, the bisphosphine is 1,3-bis[di(2-methoxyphenyl)phosphino]propane, the primary aliphatic alcohol is methanol, the tertiary aliphatic alcohol is tertiary butyl alcohol, and the aromatic hydrocarbon is toluene.

8. The process of claim 7 wherein the catalyst further comprises (d) a 1,4-quinone present in an amount of about 5 to about 5000 mols per gram atom of palladium.

9. The process of claim 8 wherein the polymerization is carried out at a temperature in the range of about 50° C. to about 100° C., at a pressure in the range of about 30 bar to about 100 bar, with an amount of catalyst compostion containing in the range of about $10^{-6}$ to about $10^{-4}$ gram atom of palladium per mol of α-olefin to be polymerized, the amount of component (b) present in the catalyst is in the range of about 1 to about 25 mols per gram atom of palladium, and the amount of component (c) present in the catalyst is in the range of about 0.75 to about 1.5 mols per gram atom of palladium.

10. The process of claim 1 wherein the polymerization is carried out at a temperature in the range of about 40° C. to about 120° C., at a pressure in the range of about 20 bar to about 150 bar, with an amount of catalyst compostion containing in the range of about $10^{-7}$ to about $10^{-3}$ gram atom of palladium per mol of α-olefin to be polymerized, the amount of component (b) present in the catalyst is in the range of about 0.5 to about 50 mols per gram atom of palladium, and the amount of component (c) present in the catalyst is in the range of about 0.5 to about 2 mols per gram atom of palladium.

11. The process of claim 10 wherein the aliphatic primary alcohol is selected from the group consisting of methanol, ethanol, propanol-1, butanol-1 and glycol, the tertiary mono-alcohol is selected from the group consisting of tertiary butyl alcohol and tertiary amyl alcohol, and the aromatic hydrocarbon is selected from the group consisting of toluene and xylene.

12. The process of claim 11 wherein component (a) is a palladium salt of of a carboxylic acid, component (b) is a non-noble transition metal salt of a perchloric acid, and component (c) is a bisphosphine in which $R^5$, $R^6$, $R^7$, $R^8$ and are phenyl groups.

13. The process of claim 12 wherein the α-olefin is propene, the bisphosphine is 1,3-bis[di(2-methoxyphenyl)phosphino]propane, and wherein the primary aliphatic alcohol is methanol, the tertiary aliphatic alcohol is tertiary butyl alcohol, and the aromatic hydrocarbon is toluene.

14. The process of claim 1 wherein the aliphatic primary alcohol is selected from the group consisting of methanol, ethanol, propanol-1, butanol-1 and glycol, the tertiary mono-alcohol is selected from the group consisting of tertiary butyl alcohol and tertiary amyl alcohol, and the aromatic hydrocarbon is selected from the group consisting of toluene and xylene.

15. The process of claim 14 wherein the primary aliphatic alcohol is methanol, the tertiary aliphatic alcohol is tertiary butyl alcohol, and the aromatic hydrocarbon is toluene.

16. The process of claim 15 wherein component (a) is a palladium salt of of a carboxylic acid, component (b) is a non-noble transition metal salt of a perchloric acid, and component (c) is a bisphosphine in which the aryl groups $R^5$, $R^6$, $R^7$, and $R^8$ are phenyl groups.

17. The process of claim 16 wherein component (a) is palladium acetate, component (b) is a nickel salt of a perchloric acid, and in component (c) the polar substituents are alkoxy or thioalkoxy groups.

18. The process of claim 17 wherein the polymerization is carried out at a temperature in the range of about 40° C. to about 120° C., at a pressure in the range of about 20 bar to about 150 bar, with an amount of catalyst compostion containing in the range of about $10^{-7}$ to about $10^{-3}$ gram atom of palladium per mol of α-olefin to be polymerized, the amount of component (b) present in the catalyst is in the range of about 0.5 to about 50 mols per gram atom of palladium, and the amount of component (c) present in the catalyst is in the range of about 0.5 to about 2 mols per gram atom of palladium.

19. The process of claim 1 wherein component (c) is a bisphophine in which the groups $R^5$, $R^6$, $R^7$, and $R^8$, are all phenyl groups.

20. The process of claim 19 wherein in component (c) the polar substituents are selected from the group consisting of thioalkoxy and alkoxy groups.

21. The process of claim 20 wherein the polymerization is carried out at a temperature in the range of about 40° C. to about 120° C., at a pressure in the range of about 20 bar to about 150 bar, with an amount of catalyst compostion containing in the range of about $10^{-7}$ to about $10^{-3}$ gram atom of palladium per mol of α-olefin to be polymerized, the amount of component (b) present in the catalyst is in the range of about 0.5 to about 50 mols per gram atom of palladium, and wherein the amount of component (c) present in the catalyst is in the range of about 0.5 to about 2 mols per gram atom of palladium.

* * * * *